April 6, 1926.  1,579,609
H. O. HEM
WEIGHING SCALE
Filed Dec. 16, 1922      2 Sheets-Sheet 1
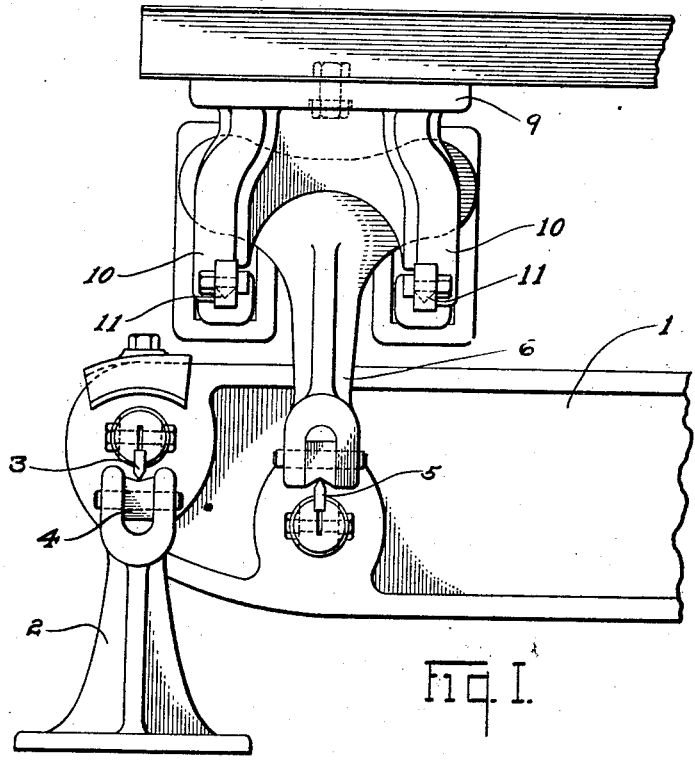
Fig. I.
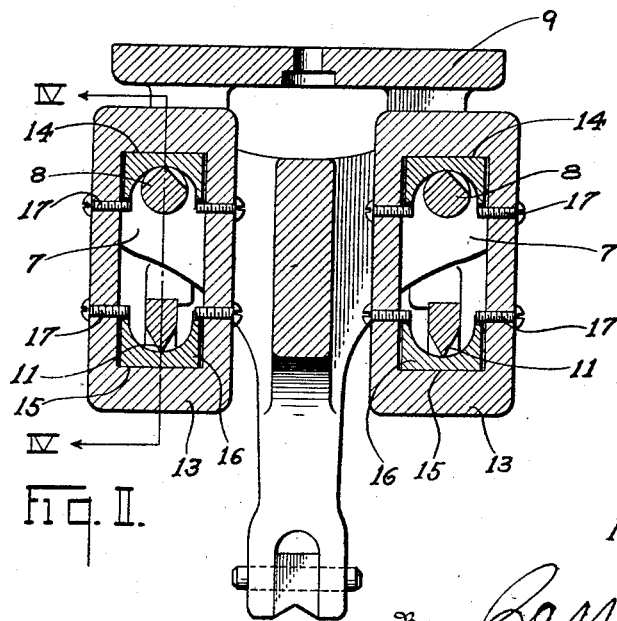
Fig. II.
Inventor
HALVOR O. HEM.
By C. O. Marshall
Attorney

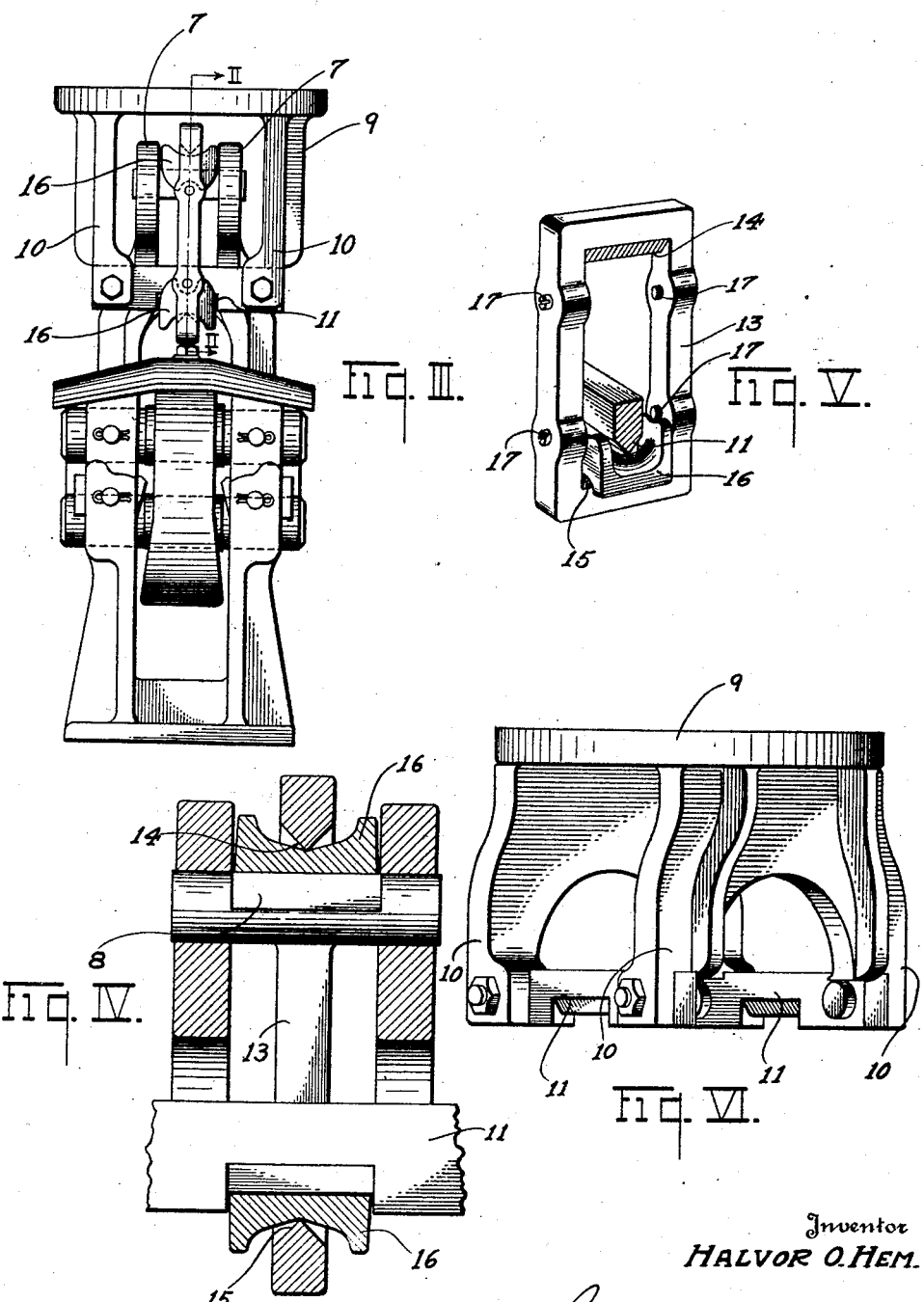

Patented Apr. 6, 1926.

1,579,609

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed December 16, 1922. Serial No. 607,275.

*To all whom it may concern:*

Be it known that I, HALVOR O. HEM, a citizen of the United States, residing at Toledo, in the county of Lucas and State of Ohio, have invented certain new and useful Improvements in Weighing Scales, of which the following is a specification.

This invention relates to weighing scales, and more particularly to suspension bearings for scales of the type designed for weighing comparatively heavy loads. It is important that the platform in a scale of this type be so supported on the scale levers that it may yield when a load is moved onto the platform from the side, and such platforms are usually supported by means of links so that they may have a universal swinging movement. When such platforms are so supported as to swing from the load pivots of the levers the swinging movement of the platform results in wear upon the pivots which is much greater than that caused by weighing movements of the levers.

One of the objects of this invention is to provide a support for scale platforms which permits universal swinging movement of the platform without consequent relative movement of the load pivots and bearings, the construction being such that the platform structure is swingingly supported on knife edge pivots so that the connections will invariably return to their original condition of plumbness after they have been moved out of plumb by the swinging movement of the platform.

Another object is the provision of a device of the class outlined in the preceding paragraph which is of simple and inexpensive construction and which is not liable to become disarranged or to be affected by dirt or corrosion.

Still another object of the invention is the provision of a parallel link suspension for scale platform structure in which the ends of the links form knife edge pivots.

And still another object is the provision of a parallel link suspension for platform structure in which the ends of the links form knife edge pivots and are engaged with cradles which in turn form bearings for knife edge pivots fixed to the platform structure and lever mechanism respectively.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a fragmentary elevational view of a portion of a scale lever and platform structure showing the application of my invention thereto;

Figure II is a sectional view of my swinging support taken substantially on the line II—II of Figure III;

Figure III is an end elevation of the scale lever and swinging platform support;

Figure IV is an enlarged fragmentary sectional view taken substantially on the line IV—IV of Figure II;

Figure V is an isometric view of one of the suspension links; and

Figure VI is an elevational view of a platform supporting member forming an element of my invention, the member being rotated about a vertical axis through an angle of 45° from the position of Figure I.

Referring to the drawings in detail, the end of a scale platform level 1 is shown as supported upon a fulcrum stand 2 by means of a knife edge pivot 3 which is suitably fixed to the lever and rests in a V-shaped groove in a bearing block 4 which is carried by the fulcrum stand.

A load pivot 5 of the lever 1 supports a yoke-like saddle block 6, the upper portion of which terminates in oppositely-extending bifurcated members 7. Connecting the furcations of the members 7 are knife edge bars 8 which, through swinging connections that will be described in detail, support a stand 9 to which the platform girders are secured. The stand 9 has downwardly-projecting legs 10 which straddle the bifurcated extremities of the saddle block 6, the lower ends of the legs 10 being connected by means of knife edge members 11. The members 11 are positioned with their knife edges in parallel relation to the knife edges of the bars 8, one of the members 11 lying directly under each of the bars 8. Each of the members 11 with its superposed member 8 thus forms a pair and the members of each pair are connected by a rectangularly-shaped link 13. The inner sides of the ends of the links 13 are tapered to form knife edges 14 and 15, and interposed between the knife edges 8 and 14 and between the knife edges 11 and 15 are bearing blocks or cradles 16. The knife edges at the ends of the link 13 and the knife edges of the members 8 and 11 being substantially at right angles to each other, a universal joint is formed at each end of the link 13 and the platform structure is thus allowed to swing freely in all directions from the knife edge bars 8. Since the links 13 are parallel and the knife edge members 11 are held in the same horizontal plane, it is evident that the knife edge bars 8 must also remain in the same horizontal plane, even when the links 13 swing to permit yielding movement of the platform. Tilting movement of the saddle block on the load pivot 6 is thus prevented. The cradles 16 are loosely held in place by means of screws 17.

It is thought to be apparent from the foregoing description that swinging movement of the scale platform may take place in all directions without affecting the relative positions of the load pivots and bearings or of the fulcrum pivots and bearings of the lever and therefore without consequent wear of the weighing pivots.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a device of the class described, in combination, a load pivot, a member supported on said load pivot, parallel links having inwardly-turned knife edges formed at their ends depending from said member, and platform structure supported by said parallel links.

2. In a device of the class described, in combination, a pivot, a member supported thereon, said member having upwardly-turned knife edges, bearing members engaging said knife edges, parallel links having knife edges engaging said bearing members, and platform structure supported by said links.

3. In a device of the class described, in combination, a pivot, a member supported thereon, said member having upwardly-turned knife edges, bearing members engaging said knife edges, parallel links having inwardly-turned knife edges at their ends, the knife edges at the upper ends of said links engaging said bearing members, other bearing members engaging the knife edges at the lower ends of said links, and platform structure having knife edges engaging the last said bearing members.

4. In a device of the class described, in combination, a lever, said lever having a load pivot, a saddle block supported on said load pivot, a pair of upwardly-turned knife edges on said saddle block, a bearing member engaging each of said knife edges, parallel links having inwardly-turned knife edges formed at their ends, the knife edge at the upper end of each of said links engaging one of said bearing members, bearing members engaging the knife edges at the lower ends of said links, a platform supporting stand lying above said saddle block and having legs extending downwardly to approximately the level of the bearings engaging the knife edges at the lower ends of said links, and knife edge members fixed to said legs and engaging the last-mentioned bearing members.

5. In a device of the class described, in combination, a lever having a load pivot extending on both sides thereof, a saddle block straddling said lever and having bearings engaging said load pivot on each side of said lever, a pair of bars fixed to said saddle block, said bars having knife edges lying in the same horizontal plane, bearing members engaging said knife edges, a pair of links each having inwardly-turned knife edges formed at its ends, the knife edges at the upper ends of said links engaging said bearing members, other bearing members engaging the knife edges at the lower ends of said links, a platform supporting stand, and knife edge bars fixed to said platform supporting stand, the knife edges of said bars engaging the bearing members at the lower ends of said links.

6. In a device of the class described, in combination, a lever having a load pivot extending from both sides thereof, a saddle block straddling said lever and having bearings engaging said load pivot on each side of said lever, said saddle block having bifurcated portions lying above said lever, bars fixed to the furcations of said portions and having upwardly-turned knife edges lying in the same horizontal plane, links having inwardly-turned knife edges at their ends, a platform supporting stand, bars with downwardly-turned knife edges fixed to said stand, and bearing members interposed between the knife edge bars fixed to said saddle block and said links and between said links and the knife edge bars fixed to said platform supporting stand.

7. In a device of the class described, in combination, a lever having a load pivot, a platform, and a compensating rocking bearing interposed between said load pivot and said platform, said compensating bearing comprising a saddle block having a pair of knife edge pivots fixed thereto, a pair of links having knife edge pivots formed at their ends, the platform supporting structure having a pair of knife edge pivots fixed thereto, the knife edge pivots at the upper and lower ends of said links being respectively opposed to and lying at right angles to the knife edge pivots of said saddle block and said platform structure, and bearing members interposed between the opposed pivots.

8. In a device of the class described, in combination, a lever, said lever having a load pivot, a member supported on said load pivot, parallel links depending from said member, a platform structure supported by said links, and bearing blocks interposed between said links and said member and between said links and said platform structure, said links having line contacts with said bearing blocks, said member and said platform structure having line contacts with said bearing blocks at right angles to the line contacts of said links with said bearing blocks.

9. In a device of the class described, in combination, a link having inwardly turned knife edges at its ends, bearing blocks engaging said knife edges, and screws projecting from said link into juxtaposition with said bearing blocks and means on said blocks co-operating with said screws to prevent accidental disassembly of said bearing blocks and said link.

HALVOR O. HEM.